United States Patent
Gaskins et al.

(10) Patent No.: US 7,302,599 B2
(45) Date of Patent: *Nov. 27, 2007

(54) INSTANTANEOUS FREQUENCY-BASED MICROPROCESSOR POWER MANAGEMENT

(75) Inventors: Darius D. Gaskins, Austin, TX (US); Charles John Holthaus, Round Rock, TX (US)

(73) Assignee: VIA Technologies, Inc., Taipei (TW)

( * ) Notice: Subject to any disclaimer, the term of this patent is extended or adjusted under 35 U.S.C. 154(b) by 482 days.

This patent is subject to a terminal disclaimer.

(21) Appl. No.: 10/816,020

(22) Filed: Apr. 1, 2004

(65) Prior Publication Data

US 2005/0182983 A1    Aug. 18, 2005

Related U.S. Application Data

(60) Provisional application No. 60/544,206, filed on Feb. 12, 2004.

(51) Int. Cl.
*G06F 1/32* (2006.01)
(52) U.S. Cl. ...................... 713/322; 713/320
(58) Field of Classification Search ............ None
See application file for complete search history.

(56) References Cited

U.S. PATENT DOCUMENTS

| | | | |
|---|---|---|---|
| 5,544,138 | A | 8/1996 | Bajorek et al. |
| 5,557,557 | A | 9/1996 | Frantz et al. |
| 5,719,800 | A | 2/1998 | Mittal et al. |
| 5,815,724 | A | 9/1998 | Mates |
| 5,926,641 | A | 7/1999 | Shay |

(Continued)

FOREIGN PATENT DOCUMENTS

CN    1332398 A    1/2002

(Continued)

OTHER PUBLICATIONS

Rotem et al., "Analysis of Thermal Monitor Features of the Intel Pentium M Processor." Downloaded from http://www.cs.virginia.edu~skedron/tecs/men.pdf on Mar. 7, 2007.

(Continued)

*Primary Examiner*—Rehana Perveen
*Assistant Examiner*—Anand B. Patel
(74) *Attorney, Agent, or Firm*—Gary R. Stanford; Richard K. Huffman; James W. Huffman

(57) ABSTRACT

A power management controller for instantaneous frequency-based microprocessor power management including first and second PLLs, select logic, and source control logic. The first PLL generates a first core source clock signal at a first frequency based on a bus clock signal. The second PLL generates a second core source clock signal at a programmable frequency based on a frequency control signal and the bus clock signal. The select logic selects between the first and second core source clock signals to provide a core clock signal for the microprocessor based on a select signal. The source control logic detects power conditions via at least one power sense signal, provides the frequency control signal according to the power conditions, and provides the select signal. The power management controller enables transition from one power state to another in a single clock cycle, which is significantly faster than conventional power management techniques.

16 Claims, 3 Drawing Sheets

U.S. PATENT DOCUMENTS

| | | | |
|---|---|---|---|
| 5,996,083 | A | 11/1999 | Gupta et al. |
| 6,172,611 | B1 | 1/2001 | Hussain et al. |
| 6,233,691 | B1 | 5/2001 | Atkinson |
| 6,259,293 | B1 * | 7/2001 | Hayase et al. ............... 327/276 |
| 6,384,733 | B1 | 5/2002 | Seesemann |
| 6,438,697 | B2 | 8/2002 | Atkinson |
| 6,448,834 | B2 | 9/2002 | Takaki |
| 6,487,668 | B2 | 11/2002 | Thomas et al. |
| 6,609,211 | B2 | 8/2003 | Atkinson |
| 6,671,175 | B1 | 12/2003 | Chen |
| 6,836,849 | B2 | 12/2004 | Brock et al. |
| 7,006,943 | B1 | 2/2006 | Mitchell et al. |
| 7,017,061 | B2 | 3/2006 | Lippert et al. |
| 7,019,577 | B2 * | 3/2006 | Agrawal et al. ............ 327/296 |
| 7,069,463 | B2 | 6/2006 | Oh |
| 2005/0044429 | A1 | 2/2005 | Gaskins et al. |
| 2005/0178133 | A1 | 8/2005 | Henry et al. |

FOREIGN PATENT DOCUMENTS

| | | |
|---|---|---|
| CN | 1438533 | 8/2003 |
| JP | 07209091 A | 8/1995 |
| TW | 0548534 B | 8/2003 |
| TW | 573760 | 1/2004 |

OTHER PUBLICATIONS

Intel 64 and IA-32 Architectures Software Developer's Manual, vol. 3A: System Programming Guide, Part 1, Nov. 2006, pp. 13-1, and 13-5 to 13-15.

Intel Pentium M Processor with 2-MB L2 Cache and 533-MHz Front Side Bus, Datasheet, Jul. 2005, pp. 14 and 62-64, Reference No. 305262-002.

Wireless Intel SpeedStep Power Manager, "Optimizing power consumption for the Intel PXA27x processor family," Intel, 2004, pp. 1-16.

"Enhanced Intel SpeedStep Technology for the Intel Pentium M Processor," Mar. 2004, pp. 1-12.

* cited by examiner

INSTANTANEOUS FREQUENCY-BASED MICROPROCESSOR POWER MANAGEMENT

CROSS-REFERENCE TO RELATED APPLICATIONS

This application claims the benefit of U.S. Provisional Application No. 60/544,206, filed on Feb. 12, 2004, which is herein incorporated by reference for all intents and purposes.

This application is related to the following co-pending U.S. Patent Application, which is filed on the same day as this application, which has a common assignee and at least one common inventor, and which is herein incorporated by reference in its entirety for all intents and purposes:

| SER. NO. | FILING DATE | TITLE |
| --- | --- | --- |
| 10/816004 (CNTR.2216) | Apr. 1, 2004 | FREQUENCY-VOLTAGE MECHANISM FOR MICROPROCESSOR POWER MANAGEMENT |

BACKGROUND OF THE INVENTION

1. Field of the Invention

The present invention relates to microprocessor power management, and more particularly to providing means for dynamically adjusting the power consumed by a microprocessor in a manner that does not incur undue delays.

2. Description of the Related Art

Power consumption management is an important issue for several types of computing systems, including portable devices, laptop computers, and environmentally friendly computers (i.e., "green" computers). Battery life, for example, is a significant issue for most laptop computer users. The microprocessor consumes a significant amount of power, so that it is often the target of power reduction techniques. The challenge for microprocessor designers is to provide a means for changing the power state of the microprocessor in a smooth and relatively seamless fashion, and to complete such transition as quickly as possible. Several different techniques for modifying the power consumption of a microprocessor are known, including, for example, dynamically changing the frequency of the microprocessor's core clock signal. The power consumption of a microprocessor is proportional to the frequency of its core clock signal.

FIG. 1 is a simplified block diagram of a conventional power management system 100, which illustrates how frequency-based power management is accomplished in existing microprocessors. A SENSE interface 101 (e.g., sense bus or the like) provides one or more power sense signals to power management logic 103. The power management logic 103 determines a power state at which the microprocessor should be executing based on the immediate and/or previous states of the sense signals of the SENSE interface 101. Exemplary sense signals on the sense interface 101 include, for example, values of machine specific registers written by software, such as the operating system (OS) software or the like, temperature transducers (not shown), remaining power signals, etc. To execute at a particular power state, the power management logic 103 establishes value on a core ratio (CORERATIO) bus which is provided to a phase lock loop (PLL) 105. The PLL 105 generates a CORE CLOCK signal as a function of the frequency of a BUS CLOCK signal and the value of the CORERATIO bus from the power management logic 103, where the CORE CLOCK signal is fed back to the PLL 105. A core clock ratio value of three (3), for example, would direct the PLL 105 to generate the CORE CLOCK signal that is three times the frequency of the BUS CLOCK signal.

As understood by those skilled in the art, the PLL 105 generally multiplies the frequency of the external BUS CLOCK signal and generates the CORE CLOCK signal for internal use. For example, a 500 megahertz (MHz) BUS CLOCK signal is multiplied by eight (e.g., CORERATIO=8) to yield a 4.0 gigahertz (GHz) machine during full power conditions. The PLL 105 keeps the CORE CLOCK signal in phase with the BUS CLOCK signal. The CORERATIO bus value indicates a reduced frequency of operation for reduced power levels, such as a 25% power level (CORERATIO=2), a 50% level (CORERATIO=4), a 75% level (CORERATIO=6), etc.

The conventional power management system 100, which provides for dynamically changing the power state of a microprocessor, is disadvantageous because the PLL 105 incurs a significant delay to change from one frequency to the next. The delay is often substantial, such as on the order of hundreds of clock cycles. The computer system may be temporarily suspended during each PLL frequency change delay. For example, if an application is running on the microprocessor that is performing a relatively simple function, such as a DVD decode or the like, it is very likely that power can be conserved by running at a reduced frequency, such as half-frequency. The power management logic 103 detects power sense signals indicating a reduced power state and directs the PLL 105 via the CORERATIO bus to ramp down in frequency. A commensurate delay occurs while the PLL 105 is ramping down. In addition, other tasks may be invoked by the OS during or shortly after that time, which require immediate changeover back to full operating frequency. Such events cause additional delays and performance degradation until the PLL 105 ramps back up to the full operating frequency. These frequency change delays are often detected by the user, in that applications may appear to be locked up from time to time. Existing frequency modulation techniques, therefore, disadvantageously affect overall performance.

SUMMARY OF THE INVENTION

A power management controller for instantaneous frequency-based microprocessor power management according to an embodiment of the present invention includes first and second phase lock loops (PLLs), select logic, and source control logic. The first PLL generates a first core source clock signal at a first frequency based on a bus clock signal. The second PLL generates a second core source clock signal at a programmable frequency based on a frequency control signal and the bus clock signal, where the second PLL generates a lock signal when the second core source clock signal is at a frequency indicated by the frequency control signal. The select logic selects between the first and second core source clock signals to provide a core clock signal for the microprocessor based on a select signal. The source control logic detects power conditions via at least one power sense signal, provides the frequency control signal according to the power conditions, and provides the select signal. The said source control logic controls the select signal to switch from the first core source clock signal to the second core source clock signal in response to the lock signal.

The power management controller enables transition from one power state to another in a single clock cycle. The source control logic selects the first core source clock signal while the second PLL is programmed with the second core source clock signal, which is, for example, at a reduced frequency to achieve a reduced power level. Once the second PLL is programmed, the source control logic instructs the select logic to switch to the second PLL. Such transition is significantly faster than that which has heretofore been provided, thus allowing users to benefit from power adjustments without incurring undue delay or performance degradation.

In various embodiments, the first frequency may be associated with the full operating frequency of the microprocessor, whereas the second core source clock signal is programmed to a reduced frequency appropriate for reduced power conditions. The one or more power signals may be provided by any of multiple mechanisms, such as registers, transducers, power signals, etc. The operating system of a computer system may program a register of the microprocessor to indicate a particular reduced power level, where the source control logic reads the programmed register and asserts the frequency control signal accordingly. Temperature transducers and other power signals (e.g., low battery indicators) are contemplated.

A microprocessor according to an embodiment of the present invention includes a sense interface, a clock source controller, a primary PLL, a programmable PLL, select logic, and at least one internal programmable register. The sense interface receives at least one power sense signal indicative of power conditions. The clock source controller provides a select signal for switching between first and second core clock signals, provides a core ratio bus indicative of a reduced core clock frequency, and receives a lock signal indicating that the reduced core clock frequency is operative. The primary PLL provides the first core clock signal at a first frequency based on a bus clock signal. The programmable PLL generates the second core clock signal at a frequency based on the core ratio bus and the bus clock signal and provides the lock signal. The select logic selects between the first and second core clock signals to provide a core clock signal based on the select signal. The programmable register is coupled to the sense interface.

In various embodiments, the sense interface may receive one or more external power sense signals or internal microprocessor signals, such as from programmable registers or the like. The clock source controller determines a reduced power level sufficient to meet the power conditions, and provides the core ratio bus to indicate a core clock frequency to achieve the reduced power level. The clock source controller switches the select signal to select the programmable PLL in response to receiving the lock signal. While the programmable PLL is selected, the clock source controller may switch the select signal back to the primary PLL in response to changes of power conditions.

A method of instantaneous processor power management according to an embodiment of the present invention includes generating a first source clock at a full power frequency based on a bus clock, generating a second source clock at a reduced power frequency based on the bus clock and a frequency control input, sensing power conditions, and switching between the first and second source clock signals based on sensed power conditions. The sensing includes monitoring at least one power sense signal.

The method may include programming a register to indicate a reduced power level and reading the register. The method may include initially selecting the first, source clock signal, providing the frequency control input based on sensed power conditions to indicate the reduced power frequency, ramping the second source clock signal to the reduced power frequency in response to the frequency control input, providing a lock indication when the second source clock signal achieves the reduced power frequency, and switching to the second source clock signal when the lock indication is provided. The method may further include switching within one bus clock cycle. After switching to the second source clock signal, the method may include sensing a different power condition and switching back to the first source clock signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for changing microprocessor clock speed in a quick and seamless manner. They have therefore developed an apparatus and method for instantaneous frequency-based microprocessor power management, as will be further described below with respect to FIGS. 2–4.

Figure 1:
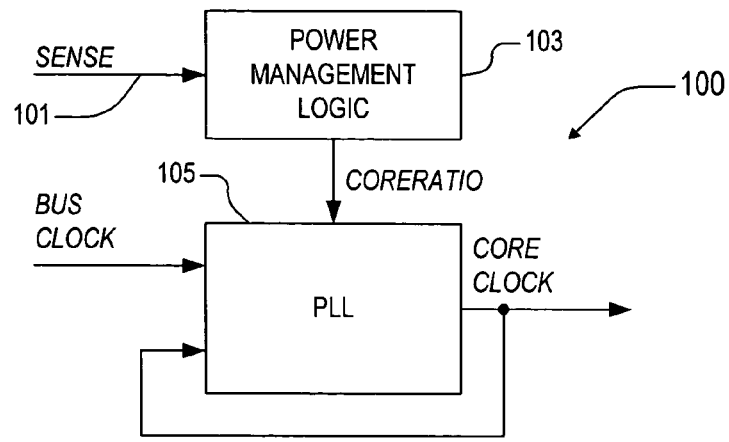
FIG. 1 is a simplified block diagram of a conventional power management system, which illustrates how frequency-based power management is accomplished in existing microprocessors.
Figure 2:
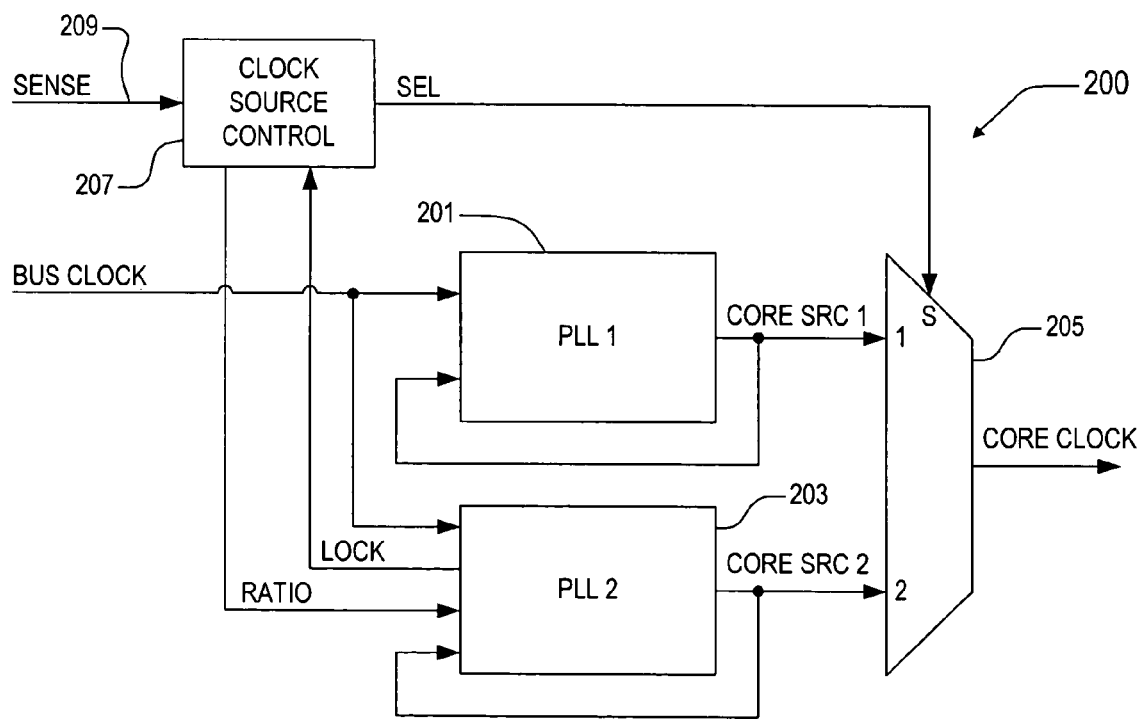
FIG. 2 is a block diagram of an exemplary instantaneous frequency-based power management system implemented according to an embodiment of the present invention.
Figure 3:
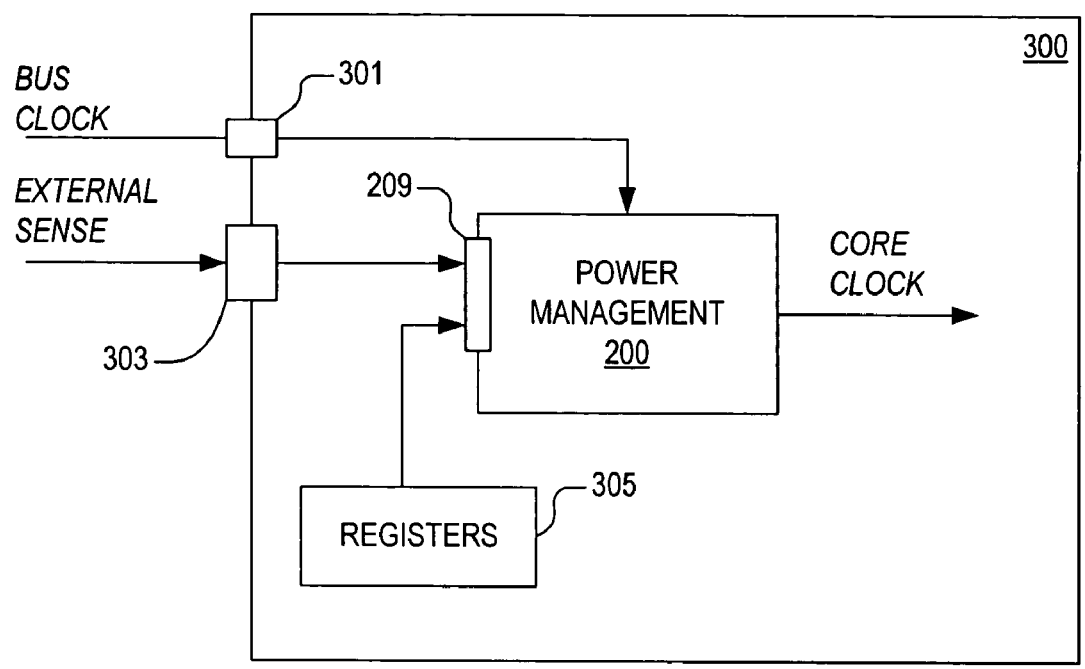
FIG. 3 is a simplified block diagram of a microprocessor including the instantaneous frequency-based power management system of FIG. 2.

FIG. 2 is a block diagram of an exemplary instantaneous frequency-based power management system 200 implemented according to an embodiment of the present invention. The power management system 200 includes two PLLs 201 and 203 operating in parallel (shown as PLL 1 and PLL 2), each receiving an external BUS CLOCK signal, such as generated on the motherboard of a computer system (not shown). The PLL 201 outputs a first core source clock signal CORE SRC 1 and the PLL 203 outputs a second core source clock signal CORE SRC 2, which signals are provided to respective inputs of a multiplexer (MUX) 205. The CORE SRC 1 signal is fed back to an input of the PLL 201 in accordance with PLL operation, and the PLL 201 maintains the CORE SRC 1 signal synchronized with the BUS CLOCK signal. In a similar manner, the CORE SRC 2 signal is fed back to an input of the PLL 203, which maintains the CORE SRC 2 signal synchronized with the BUS CLOCK signal. The output of the MUX 205 provides a CORE CLOCK signal, which is a selected one of the CORE SRC 1 and 2 signals based on a select input (S) receiving a select signal SEL. The selected CORE CLOCK signal is used internally by a microprocessor 300 (FIG. 3).

The PLL 201 runs continuously and multiplies the frequency of the external BUS CLOCK signal by a predetermined multiple to enable full operating frequency and full power mode of the microprocessor 300. The PLL 203 is programmable to produce alternative and usually reduced frequencies that fall within a frequency range that is desirable for power management purposes. Clock source control logic (or controller) 207 senses power conditions of the system via power sense signals on a SENSE interface 209 (e.g., bus) in a similar manner as described above for the power management logic 103. The clock source control logic 207 directs the PLL 203 via setting the value of a core ratio (RATIO) bus to ramp up or down to a specified frequency multiple that achieves power management goals for the microprocessor 300 as indicated by the power sense signals. In the particular embodiment illustrated, the value of the RATIO bus indicates a multiple value relative to the BUS CLOCK signal, although other formats are contemplated and is generally considered a frequency control signal. The RATIO bus may be embodied as an analog signal having a value that indicates the multiple value, or it may be embodied as one or more digital signals whose states together indicate the multiple value. The PLL 203 changes frequency in response to the RATIO bus, and indicates to the clock source control logic 207 that it is operating at the specified frequency by asserting a signal LOCK. At this point, the clock source control logic 207 optionally directs the MUX 205 to select CORE SRC 2 as the CORE CLOCK signal via the SEL signal if the power conditions for the new frequency level are still valid and/or desired. The transition from CORE SRC 1 to CORE SRC 2 is "instantaneous," such as within a single cycle of the BUS CLOCK signal.

It is noted that the power management system 200 operates using CORE SRC 1 as the selected CORE CLOCK while the PLL 203 is changing until locked at the new target frequency, at which time the clocks are switched in a quick and seamless manner. Thus, the transition from one power state to the next is instantaneous and significantly faster than has been heretofore provided. Users benefit from power adjustments without incurring undue delay or performance degradation.

If the computing environment changes, as indicated by the SENSE interface 209, such that full operating frequency is once again required during the time that the PLL 203 is ramping up or down, then the source control logic 207 does not switch the MUX 205 from CORE SRC 1 to CORE SRC 2. In this manner, the indeterminate period of the PLL 203 during changeover does not cause degradation in performance even if power needs change again. Furthermore, after switchover to CORE SRC 2, if the computing environment changes such that full power is needed or if any other power level is indicated, then the clock source control logic 207 immediately switches back to select the CORE SRC 1 from the PLL 201 as the CORE CLOCK. Again, the switchover is instantaneous and seamless, such as within one cycle of BUS CLOCK. After switchover back to the CORE SRC 1, the clock source control logic 207 re-programs the PLL 203 to any new desired frequency level.

In the embodiment illustrated, the PLL 201 remains locked for full power operation so that switchover back to CORE SRC 1 can occur at any time and multiple times in a relatively short period. Suppose, for example, that power conditions indicate a 50% power level so that the PLL 203 ramps CORE SRC 2 to a 50% frequency level and the CORE CLOCK is switched to CORE SRC 2, and then a 75% level is suddenly needed. In this case, the clock source control logic 207 switches immediately back to select CORE SRC 1 and then sets the value of the RATIO bus to indicate a 75% level to the PLL 203. Even though more power is temporarily consumed than necessary, system delays do not occur. When the PLL 203 asserts the LOCK signal indicating that the CORE SRC 2 clock signal is locked onto the 75% frequency level, if the power conditions still indicate that the 75% power level is desired, then the CORE CLOCK is immediately switched to CORE SRC 2.

An alternative embodiment of the frequency management system according to the present invention contemplates replacing the fixed frequency PLL 201 by a programmable PLL 201, which is similar in configuration and function to the PLL 203. Accordingly, the clock ratio control logic 207 would provide another ratio bus (not shown) to the PLL 201 to program the frequency of CORE SRC 1 in a similar manner as previously described for PLL 203. The programmable PLL 201 would then provide a lock signal (not shown) back to the clock ratio control logic 207 when the CORE SRC 1 signal is locked onto the frequency indicated by the other ratio bus in a similar manner as previously described for PLL 203. The alternative embodiment provides the added flexibility in that the CORE SRC 1 signal is not fixed but instead may be programmed to any frequency other than the maximum operating frequency.

FIG. 3 is a simplified block diagram of the microprocessor 300 including the instantaneous frequency-based power management system 200. One or more pins 301 of the microprocessor 300 receive the BUS CLOCK signal from an external source, such as generated on the motherboard of a computer system, where the BUS CLOCK signal is provided to the power management system 200 within the microprocessor 300. The PLLs 201, 203 within the power management system 200 keep the CORE CLOCK signal in phase with the BUS CLOCK signal. Another external interface 303 including one or more pins receives external sense signals which are provided to the power management system 200 via the sense interface 209. The external sense signals may include, for example, signals generated by temperature transducers or the like, remaining power signals (e.g., indicating low battery power), or any other power sense signals as known to those skilled in the art. The SENSE interface 209 may also receive internal sense signals, such as from internal registers 305 or the like, or the invention may be employed without an external sense interface 303, where all sense activities are executed by the microprocessor 300 itself. In one embodiment, the operating system of a computer system employing the microprocessor 300, for example, may set one or more bits of one or more of the registers 305 to command a new power level for the microprocessor 300. The power management system 200 responds by modifying the CORE CLOCK signal as previously described.

Figure 4:
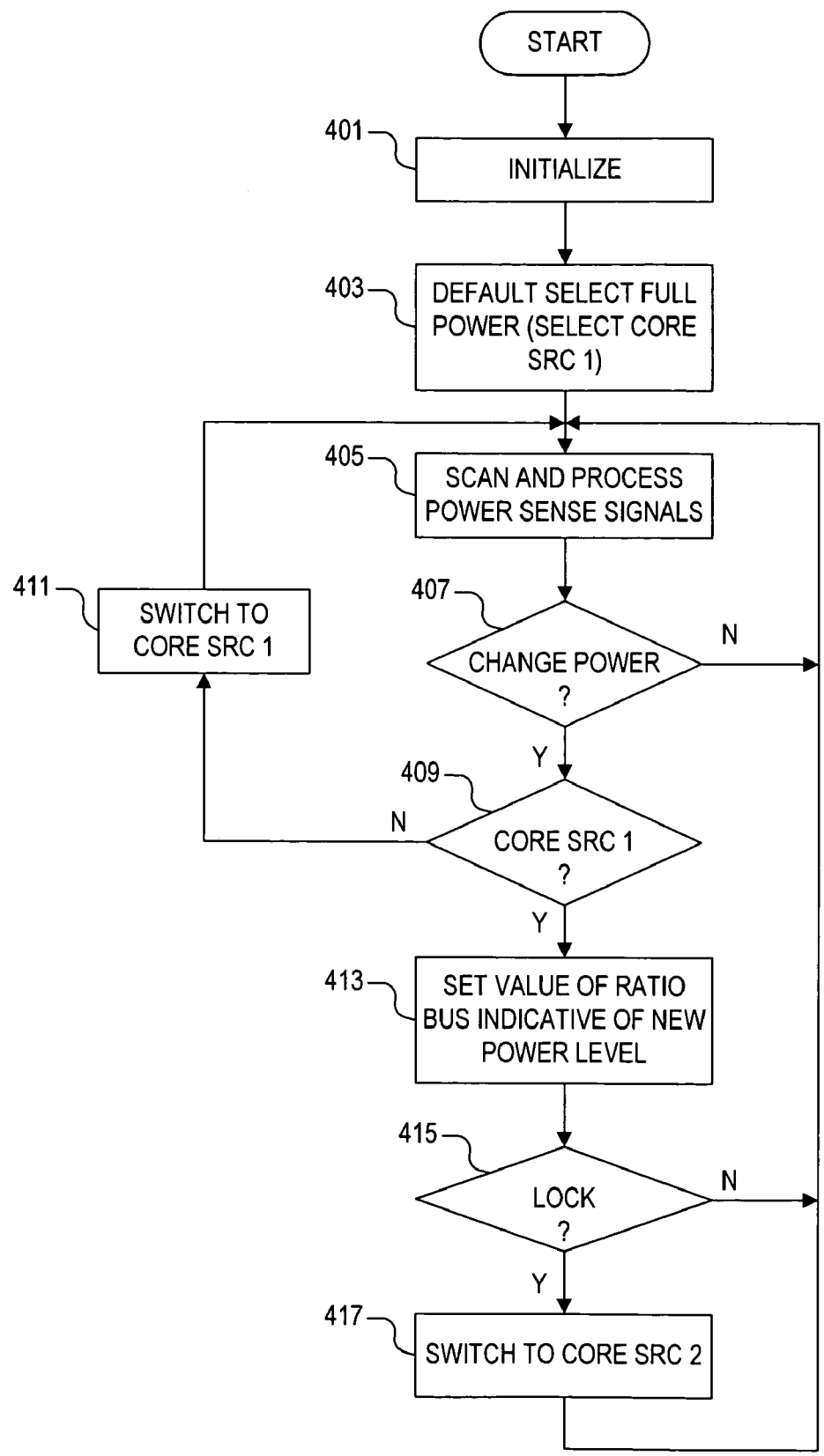
FIG. 4 is a flowchart diagram illustrating exemplary operation of the power management system of FIG. 2 according to an embodiment of the present invention.

FIG. 4 is a flowchart diagram illustrating exemplary operation of the power management system 200 according to an embodiment of the present invention. The flowchart diagram is not intended to precisely define operation of particular embodiments but is instead provided to illustrate the basic flow and decisions of power management systems implemented according to the present invention. At first block 401 the power management system 200 is initialized and at next block 403, the clock source control logic 207 selects the CORE SRC 1 signal as the CORE CLOCK signal as an initial default for full power mode. At next block 405, the power sense signals received via the SENSE interface 209 are scanned to determine whether a new and different power level is indicated. Operation proceeds to query block 407 in which it is determined whether the power level should be changed based on the processing at block 405. If the current power level is appropriate, then operation loops back to block 405 and operation loops between blocks 405 and 407 as long as the current power level is appropriate. If a new power level is needed as determined at block 407, then operation proceeds to query block 409 to determine if the CORE SRC 1 signal is selected. If the CORE SRC 1 signal is not selected, then operation proceeds to block 411 in which the clock source control logic 207 switches the SEL signal to switch to select the CORE SRC 1 signal, and operation loops back to block 405. Regardless of the current power level, if it is determined that a new and different power level is needed, then the CORE SRC 1 signal is initially selected to facilitate the change. If switching from any lower power mode back to full power mode, then the CORE SRC 1 signal is selected and maintained. But even if switching from one reduced power mode to another (e.g., from 50% to 75% or vice-versa), then the CORE SRC 1 signal is temporarily selected to enable programming of the PLL 203 for the new, reduced power level.

If the CORE SRC 1 signal is currently selected as determined at block 409, then operation proceeds instead to block 413 in which the clock source control logic 207 set the value of the RATIO bus to the appropriate level to program the PLL 203 to a new frequency level. Operation proceeds to next query block 415 in which it is determined whether the LOCK signal has been asserted by the PLL 203. Since it may take several CORE CLOCK cycles for the PLL 203 to lock to the new frequency, the LOCK signal is usually not asserted immediately. Rather than wait for the LOCK signal, operation loops back to block 405 to rescan and process the power sense signals. While the new power level remains valid, operation loops between blocks 405, 407, 409, 413 and 415 until the LOCK signal is asserted. If and when the LOCK signal is detected asserted at block 415, operation proceeds to block 417 in which the clock source control logic 207 switches to select the CORE SRC 2 signal as the CORE CLOCK signal, and then operation loops back to block 405.

It is noted that the CORE SRC 1 signal remains selected if a new power level is indicated (by block 407) and while the PLL 203 is ramping up or down to the new frequency level indicated by the RATIO bus. The clock source control logic 207 switches to select the CORE SEL 2 signal only after the PLL 203 is locked onto the new frequency level and as long as the new power level is still valid. Note, for example, that if the PLL 203 is ramping to achieve one power level and then a different power is suddenly needed, as detected at block 405 in the loop while waiting for assertion of LOCK, then block 407 determines whether the current power level matches the new power level. If so, operation loops between blocks 405 and 407 and if not, operation proceeds to block 409 and possibly to block 411 to re-establish full power mode. While the PLL 203 is ramping to a first reduced frequency level and another, different reduced power level and corresponding frequency level is indicated, then the value of the RATIO bus is set to indicate the new frequency level at block 413. While the PLL 203 is ramping to the newer frequency level, the clock source control logic 207 continues to select the CORE SRC 1 signal so that the system remains stable in spite of changing power conditions. For example, if a 50% power level is initially indicated and the PLL 203 is ramping down to a 50% frequency level, and another power level of 75% is indicated before the LOCK signal is asserted, then the value of the RATIO bus is set and the PLL 203 begins ramping instead to the 75% level while the CORE SRC 1 signal remains selected.

If the MUX 205 was switched to CORE SRC 2 signal for a first reduced power level, and then a new power level is indicated, then operation switches back to full power mode at blocks 409 and 411. The new frequency level is indicated at block 413 and operation is switched at block 417 to the new power mode if and when the LOCK signal is asserted. In this manner, the full power mode using the CORE SRC 1 signal is an intermediary mode which is entered only briefly to enable reprogramming of the PLL 203. In any of the scenarios presented, switching occurs instantaneously so that the microprocessor 300 is not suspended at any time. In this manner, the user benefits from low power modes without experiencing system suspension or apparent application lock-up.

Although the present invention has been described in considerable detail with reference to certain preferred versions thereof, other versions and variations are possible and contemplated. For example, although the present invention is illustrated for use with microprocessors, other circuit devices are contemplated. Also, the power management controller may be implemented externally for controlling multiple devices. Finally, those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A power management controller for instantaneous frequency-based microprocessor power management, comprising:
   a first PLL that generates a first core source clock signal at a first frequency based on a bus clock signal;
   a second PLL that generates a second core source clock signal at a programmable frequency based on a frequency control signal and said bus clock signals, wherein said second PLL generates a lock signal when said second core source clock signal is at a frequency indicated by said frequency control signal;
   select logic that selects between said first and second core source clock signals to provide a core clock signal for the microprocessor based on a select signal; and
   source control logic that detects power conditions via at least one power sense signal, that provides said frequency control signal according to said power conditions, and that provides said select signal, wherein said source control logic controls said select signal to switch from said first core source clock signal to said second core source clock signal in response to said lock signal.

2. The power management controller of claim 1, wherein said source control logic controls said select logic to switch said core clock signal from said first core source clock signal to said second core source clock signal within one clock cycle of said bus clock signal.

3. The power management controller of claim 1, wherein said first frequency is associated with the full operating frequency of the microprocessor.

4. The power management controller of claim 3, wherein said second core source clock signal is programmed to a reduced frequency appropriate for reduced power conditions.

5. The power management controller of claim 1, wherein said at least one power signal is provided by any of a plurality of mechanisms including registers, transducers and power signals.

6. A microprocessor, comprising:
a sense interface receiving at least one power sense signal indicative of power conditions;
a clock source controller, coupled to said sense interface, that provides a select signal for switching between first and second core clock signals, that provides a core ratio bus indicative of a reduced core clock frequency, and that receives a lock signal indicating that said reduced core clock frequency is operative;
a primary PLL, coupled to said clock source controller, that provides said first core clock signal at a first frequency based on a bus clock signal;
a programmable PLL, coupled to said clock source controller, that generates said second core clock signal at a frequency based on said core ratio bus and said bus clock signal and that provides said lock signal;
select logic that selects between said first and second core clock signals to provide a core clock signal based on said select signal; and
at least one internal programmable register coupled to said sense interface.

7. The microprocessor of claim 6, wherein said sense interface receives at least one external power sense signal.

8. The microprocessor of claim 6, wherein said clock source controller determines a reduced power level sufficient to meet said power conditions, and provides said core ratio bus to indicate a core clock frequency to achieve said reduced power level.

9. The microprocessor of claim 8, wherein said clock source controller switches said select signal to select said programmable PLL in response to receiving said lock signal.

10. The microprocessor of claim 9, wherein said clock source controller switches said select signal to select said primary PLL in response to changes of said power conditions while said programmable PLL is selected.

11. A method of instantaneous processor power management, comprising:
generating a first source clock at a full power frequency based on a bus clock;
generating a second source clock at a reduced power frequency based on the bus clock and a frequency control input;
sensing power conditions, wherein said sensing power conditions comprises monitoring at least one power sense signal; and
switching between the first and second source clock signals based on sensed power conditions.

12. The method of claim 11, further comprising programming a register to indicate a reduced power level, and wherein said monitoring at least one power sense signal comprises reading the register.

13. The method of claim 11, further comprising:
initially selecting the first source clock signal;
providing the frequency control input based on sensed power conditions to indicate the reduced power frequency;
ramping the second source clock signal to the reduced power frequency in response to the frequency control input;
providing a lock indication when the second source clock signal achieves the reduced power frequency; and
switching to the second source clock signal when the lock indication is provided.

14. The method of claim 13, wherein said switching to the second source clock signal comprises switching within one bus clock cycle.

15. The method of claim 13, wherein said sensing power conditions comprises sensing a different power condition alter said switching to the second source clock signal, and wherein said switching between the first and second source clock signals comprises switching back to the first source clock signal.

16. The method of claim 15, wherein said switching back to the first source clock signal comprises switching within one bus clock cycle.

* * * * *